(12) United States Patent
Hodson

(10) Patent No.: US 6,290,606 B1
(45) Date of Patent: Sep. 18, 2001

(54) POLYGONAL BALL DRIVE SYSTEM FOR EARTH AUGER

(75) Inventor: Scott Allen Hodson, Stillwater, OK (US)

(73) Assignee: The Charles Machines Works, Inc., Perry, OK (US)

( * ) Notice: Subject to any disclaimer, the term of this patent is extended or adjusted under 35 U.S.C. 154(b) by 0 days.

(21) Appl. No.: 09/156,025

(22) Filed: Sep. 17, 1998

Related U.S. Application Data

(60) Provisional application No. 60/060,706, filed on Sep. 19, 1997.

(51) Int. Cl.[7] ................................................ F16D 3/44
(52) U.S. Cl. ..................... 464/159; 464/106; 464/901; 279/905
(58) Field of Search ................................. 464/106, 158, 464/159, 901; 175/320; 81/177.75; 279/80, 905; 403/138, 144, 322.2, 325, 330

(56) References Cited

U.S. PATENT DOCUMENTS

| | | |
|---|---|---|
| 797,820 | 8/1905 | Peck . |
| 1,385,713 * | 7/1921 | Robinson, Jr. ..................... 464/106 |
| 1,829,392 | 10/1931 | Caldwell . |
| 2,354,184 * | 7/1944 | Daniel .............................. 464/106 |
| 2,569,812 | 10/1951 | Hanna . |
| 3,788,658 * | 1/1974 | Benjamin et al. ............... 279/905 X |
| 3,826,936 | 7/1974 | O'Rourke . |
| 4,034,574 | 7/1977 | Kuder . |
| 4,156,469 | 5/1979 | Laskey . |
| 4,174,113 * | 11/1979 | Eckman ........................... 279/905 X |
| 4,198,080 * | 4/1980 | Carpenter ........................ 403/325 X |
| 4,289,414 * | 9/1981 | Recker ............................ 464/901 X |
| 4,527,925 | 7/1985 | Bauer et al. . |
| 4,585,080 | 4/1986 | Bender . |
| 4,673,376 * | 6/1987 | Fender ................................. 464/158 |
| 4,936,701 | 6/1990 | Allen et al. . |
| 5,013,194 * | 5/1991 | Wienhold ........................ 279/905 X |
| 5,074,699 | 12/1991 | Blaisdell et al. . |
| 5,467,834 | 11/1995 | Hughes et al. . |
| 5,503,236 | 4/1996 | Tibbitts . |
| 5,547,032 * | 8/1996 | Wenzel ............................ 175/320 X |
| 5,655,848 | 8/1997 | Catron . |
| 5,738,586 | 4/1998 | Arriaga . |

FOREIGN PATENT DOCUMENTS

| 634762 * | 1/1962 | (CA) ................................. 464/158 |
|---|---|---|

* cited by examiner

Primary Examiner—Lynne H. Browne
Assistant Examiner—Greg Binda
(74) Attorney, Agent, or Firm—McKinney & Stringer, P.C.

(57) ABSTRACT

An enclosed articulating joint for coupling a drive motor to an auger type earth anchor. The joint comprises a socket member attached to the drive motor and a ball member attached to the anchor. The socket member has a polygonal internal cross section which matingly engages the contour of the ball member. A locking assembly is included for locking the ball and socket members together during operation of the system. An optional non-locking coupler is provided for bypassing the locking assembly for rapid, successive driving operations. An optional offset coupler is provided to accommodate greater degrees of axial and longitudinal misalignment between the anchor and the socket member. This drive system is particularly suitable for use with horizontal boring machines, but has many other applications.

17 Claims, 4 Drawing Sheets

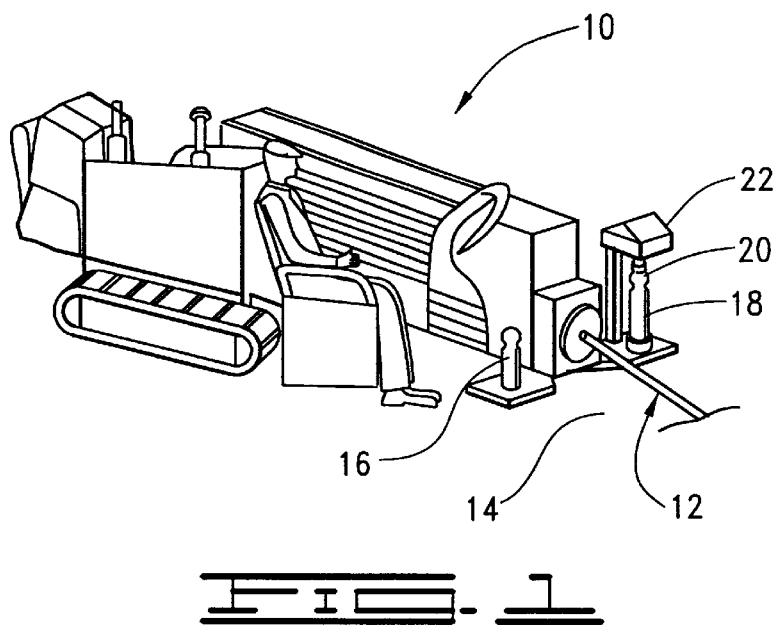
FIG. 1
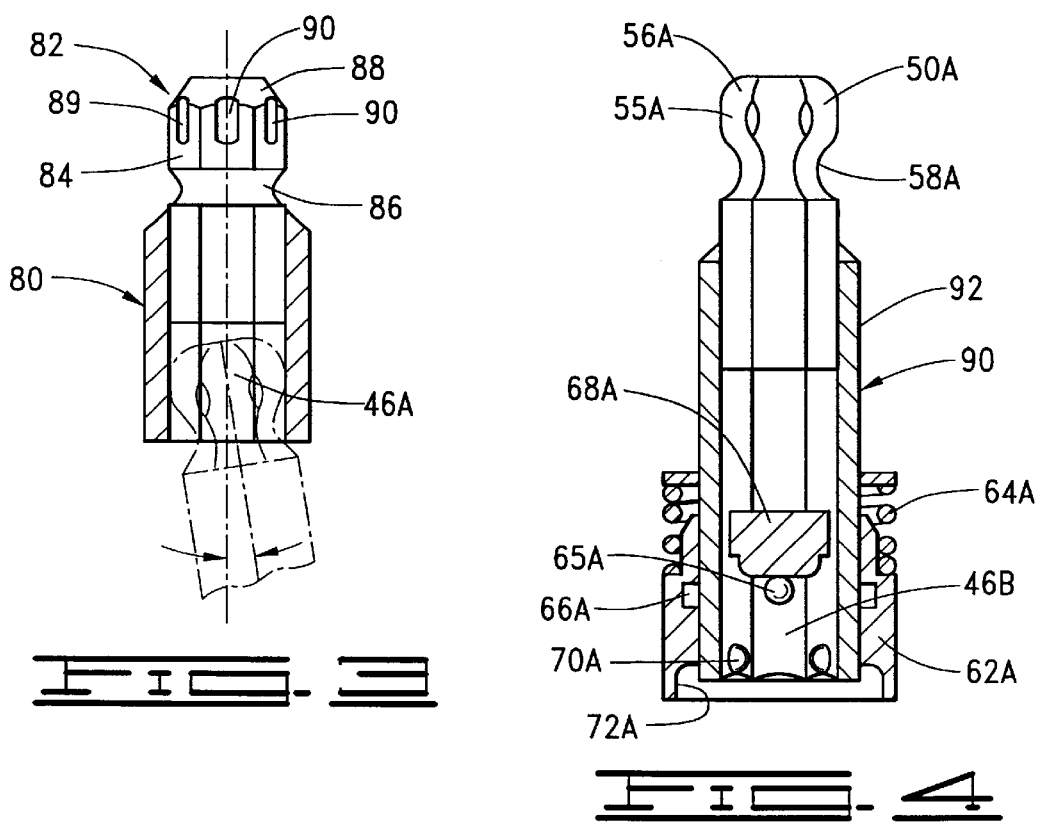
FIG. 3
FIG. 4

POLYGONAL BALL DRIVE SYSTEM FOR EARTH AUGER

REFERENCES TO RELATED APPLICATIONS

This application claims the benefit of U.S. Provisional Application No. 60/060,706, filed on Sep. 19, 1997.

FIELD OF THE INVENTION

The present invention relates generally to coupling devices for rotational drive systems and more particularly to coupling devices for driving earth augers.

SUMMARY OF THE INVENTION

The present invention is directed to a polygonal ball drive system for use with a motor assembly to implant and withdraw an apparatus from the ground. The polygonal ball drive system comprises a drive member operatively connectable to the drive motor assembly, a drive ball member having an upper portion, a non-circular central portion and a lower portion, a drive socket member having a first end and a second end, and a drive socket locking assembly.

The first end of the drive socket member is connectable to the drive member and the second end comprises a tubular portion defining a drive ball receiving chamber for torque transmitting engagement with the central portion of the drive ball member. The lower portion of the drive ball member in turn is drivingly connectable to the apparatus. The drive socket locking assembly is adapted to releasably lock the drive socket member and the drive ball member in operative engagement. The upper and lower portions of the drive ball member are such that the diameters are smaller than the central portion so as to permit angular axial misalignment of the drive ball member within the drive socket member.

The present invention is further directed toward a polygonal ball drive system for use with a drive motor assembly and an apparatus. The polygonal ball drive system comprises a drive member operatively connectable to the drive motor assembly, a drive socket member having a first end and a second end, and a drive ball member having an upper portion, a noncircular central portion and a lower portion.

The first end of the drive socket member is connectable to the drive member, and the second end comprises a tubular portion defining a drive ball receiving chamber. The upper and central portions of the drive ball member are connectable in torque transmitting engagement with the drive ball receiving chamber and the lower portion is drivingly connectable to the apparatus. The upper and lower portions of the drive ball member are such that the diameters are smaller than the central portion so as to permit angular axial misalignment of the drive ball member within the drive socket member.

BRIEF DESCRIPTION OF THE DRAWINGS

FIG. 1 is a perspective view of a horizontal boring machine comprising two front earth auger anchors, one implanted and one unimplanted, constructed in accordance with the present invention.

FIG. 3 is a side elevational, partly sectional view of a non-locking coupler made in accordance with the present invention.

FIG. 4 is a side elevational, partly sectional view of an offset coupler made in accordance with the present invention.

FIGS. 9 and 10 are similar to FIG. 8 showing the axial misalignment of the drive ball member and drive socket member.

DETAILED DESCRIPTION OF THE PREFERRED EMBODIMENTS

Figure 2:
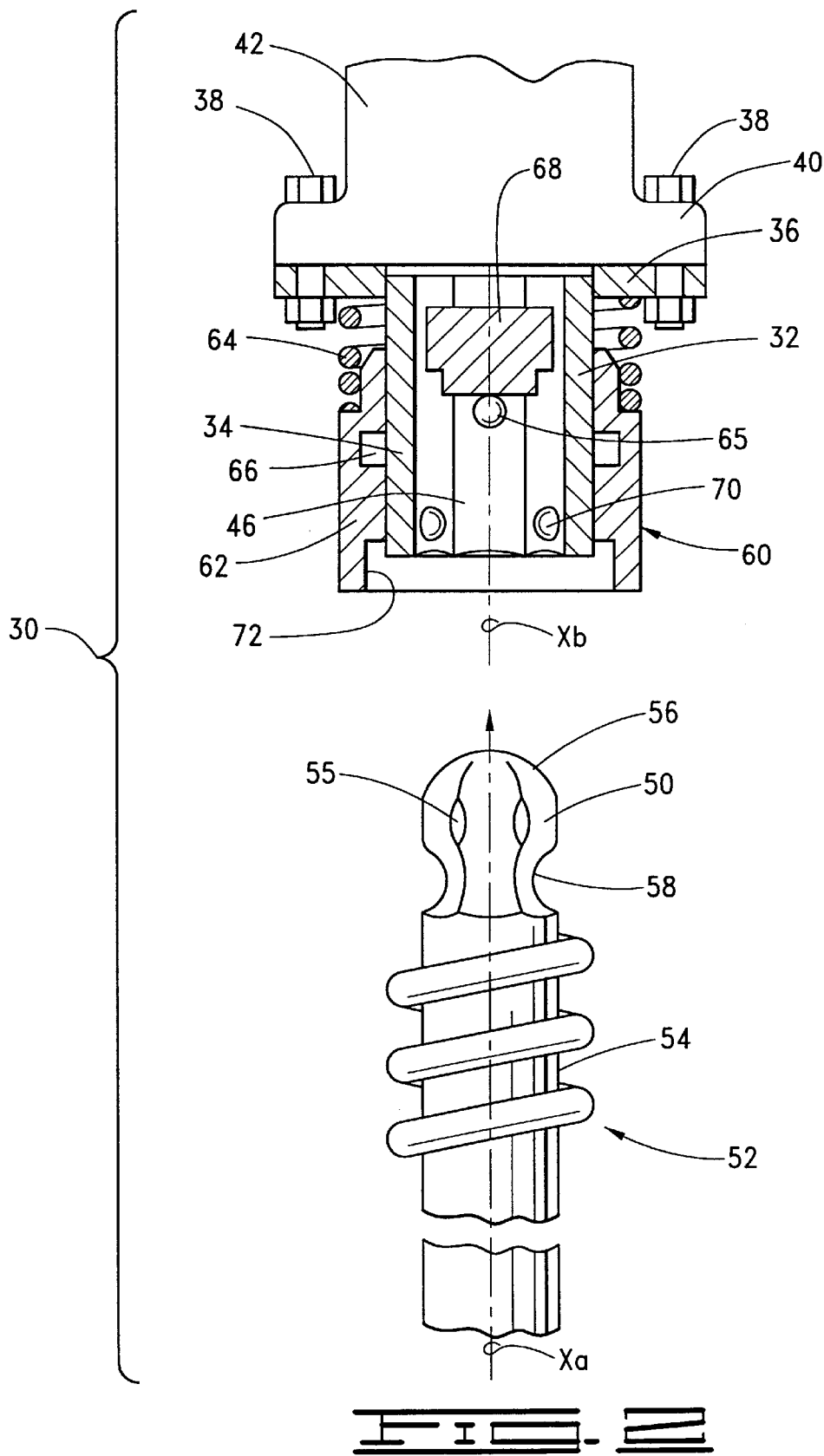
FIG. 2 is side elevational, fragmented, partly sectional view of the drive system of the present invention, showing the socket member and the ball member of the main coupler in exploded form.

Horizontal boring machines are being used with increasing frequency to form or enlarge horizontal boreholes underground for utility cables and conduits and the like. Most of these machines need to be anchored to the ground during the boring operation. While it is known to use screw or auger type anchors for this purpose, there remains a need for a quick drive system for implanting and withdrawing these devices. The present invention meets this need by providing a ball and socket joint for connecting a drive system to the anchor. While the preferred application of this invention is to horizontal boring machines, the drive system of this invention may be applied to other machines and devices which require similar stabilization.

Turning now to the drawings in general and to FIG. 1 in particular, shown therein is a horizontal boring machine 10. The machine 10 is shown in the process of driving a drill string 12 into the ground 14. The machine 10 is provided with a pair of earth anchors 16 and 18. The anchor 16 is shown implanted in the ground 14. The anchor 18 is shown connected to a drive system 20 constructed in accordance with the present invention. The drive system 20 is operatively connected to the drive motor 22. The drive motor may be any type, such as hydraulic or electric. The drive motor 22 shown herein is a small ground based unit. However, cranes and various other mechanisms may be substituted for this purpose.

With reference now to FIG. 2, the drive system of this invention comprises a main coupler 30. The coupler 30 comprises a socket member 32 having a tubular portion 34 having a flange 36 at one end. The flange 36 is attached by means of bolts 38 to the flange 40 of a drive member 42 extending from the drive motor 22 (FIG. 1). Thus, rotation of the drive motor 22 is transmitted to the coupler 30. The tubular portion 34 internally defines a receiving chamber 46 which is polygonal in cross section. Preferably, the receiving chamber is hexagonal in cross section.

Figure 9:
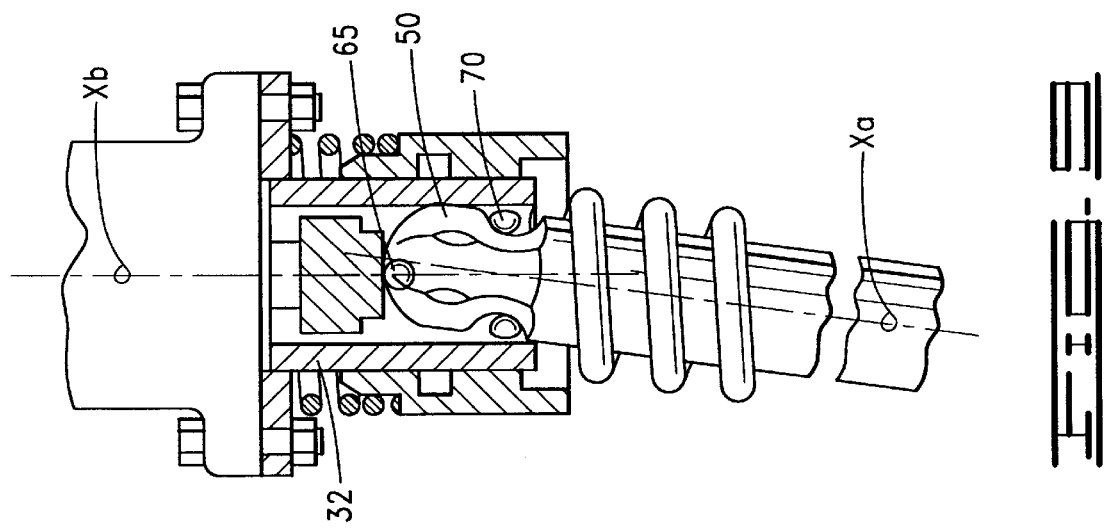
Figure 8:
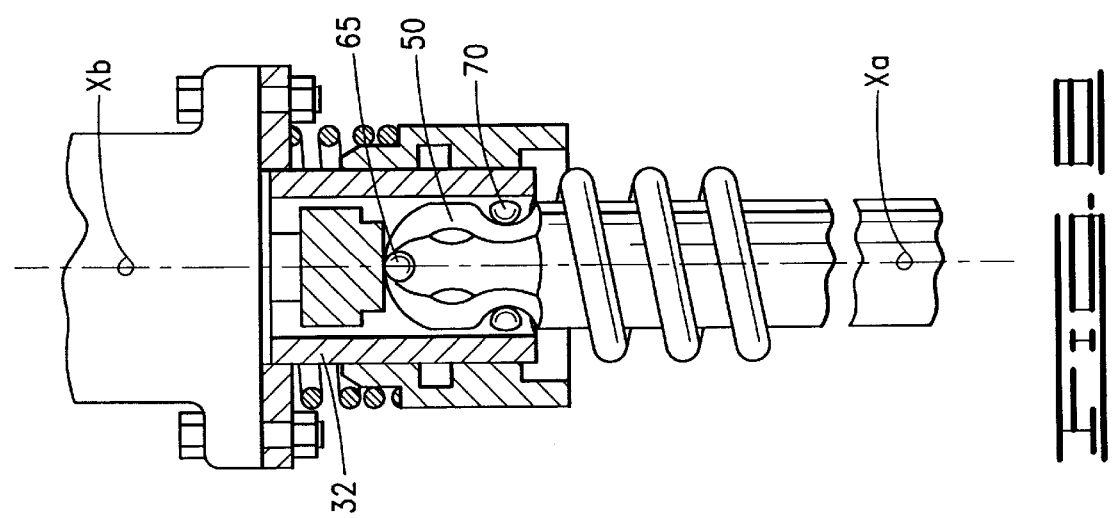
FIG. 8 is a side elevational, fragmented, partly sectional view similar to FIG. 2 showing the drive ball member releasably locked in the drive socket member with the drive ball member and drive socket member substantially aligned.

The coupler 30 further comprises a ball member 50 which is attached to the upper end of the earth anchor 52. The auger portion 54 of the earth anchor 52 is of conventional design and is not shown in its entirety. As shown in FIGS. 8–10, the ball member 50 is sized to be receivable in the receiving chamber 46 of the socket member 32. More specifically, the ball member has a polygonal central portion 55 sized to be engaged by the polygonal walls of the receiving chamber 46 whereby torque will be transmitted from the socket member 32 to the anchor 52. In a preferred embodiment the central portion 55 is hexagonal in cross section. The upper portion 56 of the ball member 50 is rounded or generally hemispherical, and the bottom of the ball member 50 narrows to form a neck 58. Thus, as shown in FIGS. 9 and 10 the ball member 50 can be tilted to a certain extent while still transmitting torque. This allows the driving or withdrawing operation to continue even though the axis Xa of the anchor 52 is misaligned with the axis Xb of the socket member 32.

In many situations it will be desirable to lock the ball member 50 in the receiving chamber 46 of the socket member 32 so that the axial movement of the ball member 50 is prevented. To that end, and referring still to FIG. 2, a locking assembly 60 may be provided. The locking assembly 60 comprises a locking collar 62 slidably received over the tubular portion 34 of the main coupler 30.

The locking collar 62 is movable between an upper or receiving position and a lower or locking position. Preferably, the collar 62 is continuously urged toward the locking position by a biasing member such as a spring 64 between the top of the collar 62 and flange 36.

The locking assembly 60 preferably includes a first retaining assembly for retaining the locking collar 62 in the receiving position. The first retaining assembly comprises a plurality of upper balls 65 trapped inside an opening in the wall of the tubular portion 34. The upper balls 65 are positioned high enough in the tubular portion 34 to be adjacent the upper portion 56 of the ball member 50 when the ball member is engaged with the socket member 32.

Figure 5:
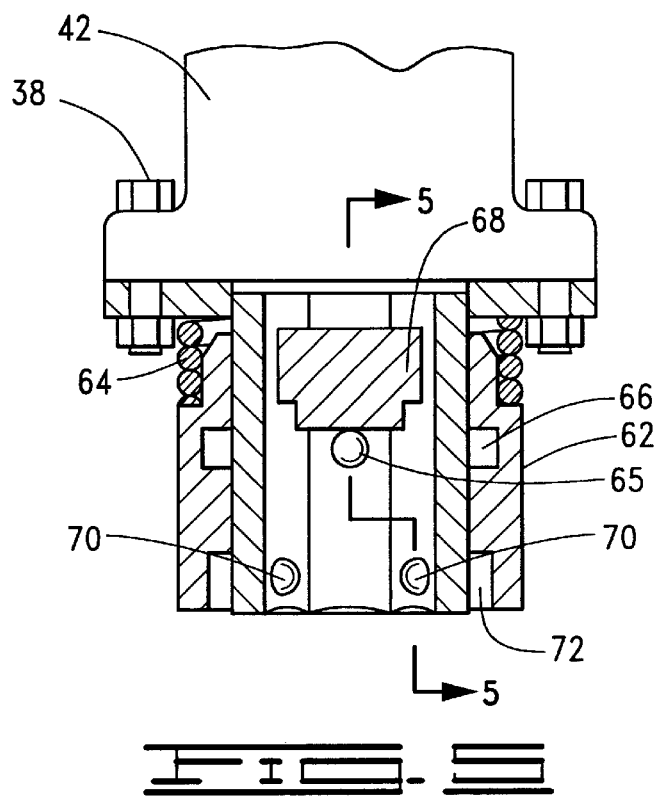
FIG. 5 is a side elevational, fragmented, partly sectional view of the socket member in the receiving position.
Figures 6, 7:
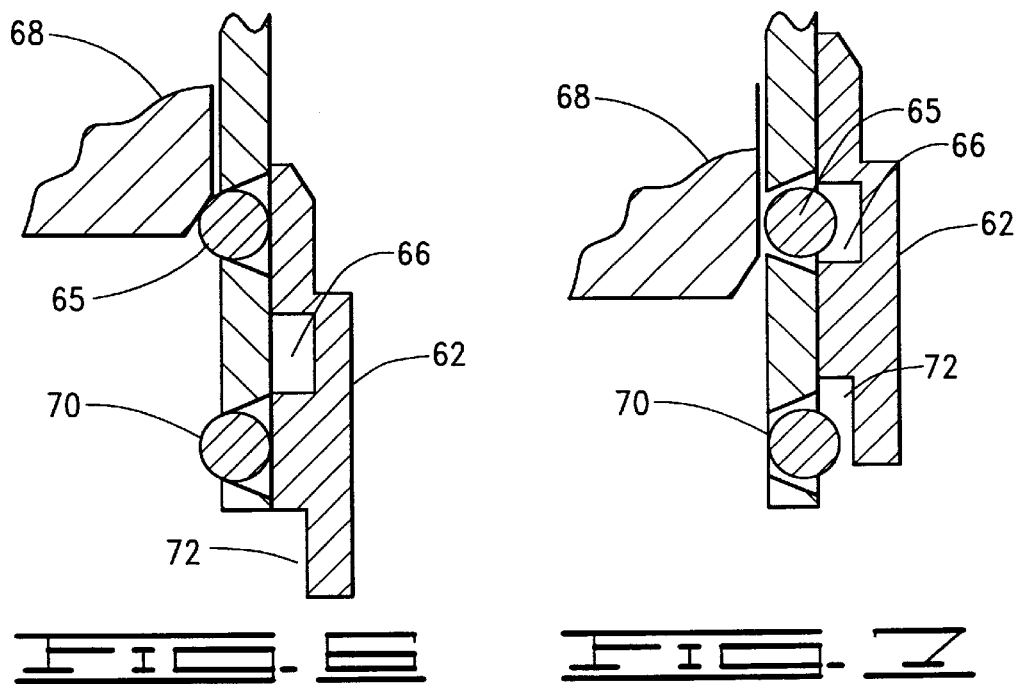
FIG. 6 is a sectional view of the drive socket locking assembly in the locking position.
FIG. 7 similarly is a sectional view taken along the line 5—5 of FIG. 5 of the drive socket locking assembly in the receiving position.
Figure 7:
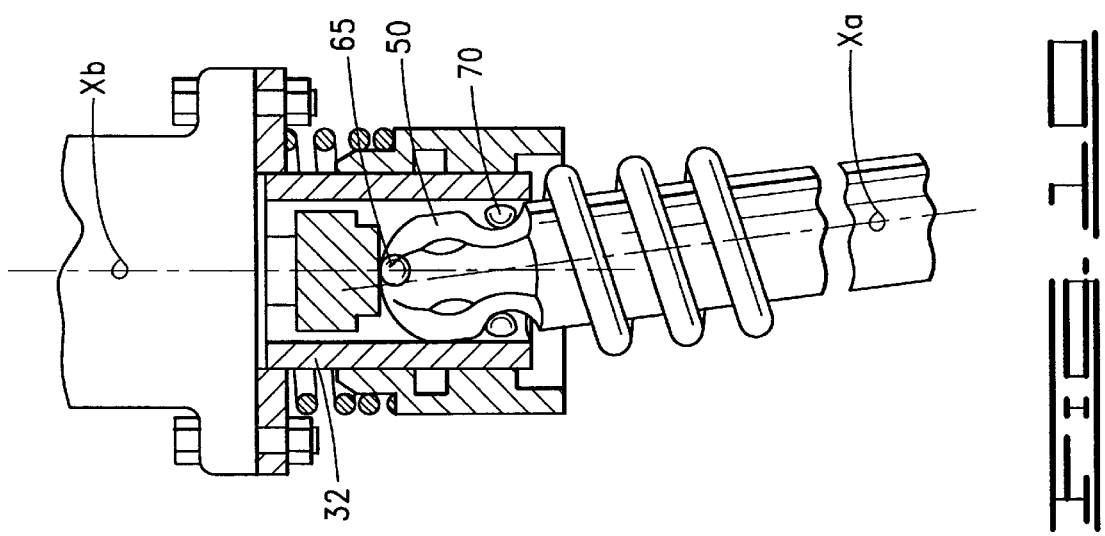

With continuing reference to FIG. 2, the collar 62 is provided with a circumferential groove 66 sized to receive a portion of each of the upper balls 65. The groove 66 is positioned longitudinally so that the groove is aligned with the upper balls 65 only when the collar 62 is in the receiving position. The locking assembly 60 further comprises a biasing assembly for continuously urging the upper balls 65 radially outward toward the collar 62. For applications where the anchor being driven is substantially vertical, the biasing assembly may take the form of a weighted plug 68 suspended in the tubular portion 34 so that the weight, by gravity, causes the plug 68 to move downwardly on the upper balls 65, urging the upper balls outwardly. Accordingly, as shown in FIGS. 5–7, when the collar 62 is moved up to the receiving position, the plug 68 pushes the balls into the groove 66. It will be appreciated that for applications where the driving system will be operated in a substantially horizontal direction, other type of biasing devices may be employed, such as a spring.

The locking assembly 60 preferably also includes a second retaining assembly for retaining the ball member 50 inside the tubular portion 34 of the socket member 32 during use of the drive system. More specifically, the second retaining assembly prevents the ball from pulling out of the receiving chamber 46 when the anchor is being withdrawn. The second retaining assembly comprises a second set of lower balls 70 which are supported in openings in the wall of the tubular portion 34. The lower balls 70 are positioned relative to the neck 58 of the ball member 50 so that when the ball member and the socket member 32 are engaged the ball member cannot be pulled out of the receiving chamber 46.

The collar 62 is provided with a second circumferential groove 72 sized to receive a portion of each of the lower balls 70 when the groove is aligned with the balls. The groove 72 is positioned low enough so as to be aligned with the lower balls only when the collar 62 is in the receiving position.

Referring still to FIG. 2, the openings in the wall of the tubular portion 34 which contain the upper and lower balls 65 and 70 are large enough to permit the balls to move between a receiving position, where the balls are partially received in the circumferential grooves, and a locking position where the balls extend partially inside the receiving chamber 46 above and below the ball member 50. The openings are countersunk (FIGS. 6 and 7) on the inside to prevent the balls from falling through into the receiving chamber 46.

To use the drive system 20, the locking collar 62 first is moved into the receiving position, so that the upper balls 65 move into the groove 66 and lock the collar into place. Next, the ball member 50 of the anchor 52 is inserted into the receiving chamber 46, which allows the balls 65 to move back toward the inside of the tubular portion 34 of the socket member 32 adjacent the top portion 56 of the ball member 50, releasing the collar 62. Now, the spring 64 forces the collar 62 down so that the lower balls 70 are also pushed back toward the inside of the tubular portion 34 of the socket member 32. This places the balls 70 inside the neck 58 of the ball member 50 and prevents downward movement of the anchor 52.

Turning now to FIG. 3, the present invention provides a non-locking coupler 80 for those situations where no locking mechanism is desired between the anchor 52 and the non-locking coupler 80. The locking assembly 60 of the socket member 32 retains the non-locking coupler 80.

The non-locking coupler 80 is a short tubular element with a polygonal head 82 on one end and a receiving chamber 46A on the other end. The receiving chamber 46A is shaped identically to the receiving chamber 46 in the tubular portion 34 (FIG. 2). However, there are no upper or lower balls and no openings therefor.

The polygonal head 82 has a straight central portion 84 which is sized to engage the receiving chamber 46 of the tubular portion 34. The lower end of the head 82 narrows to form a neck 86 and the top portion 88 is beveled. The spherical configuration of the ball member 50 is not used as there is no tilt occurring at this joint. Rather, tilt occurs as described above as the ball member 50 moves inside the receiving chamber 46A. To receive the upper balls 65 while the head 82 is engaged with the tubular portion 34, the upper ends of the planar side in the central portion 84 of the head 82 have recesses 89.

Thus, the polygonal head 82 can be locked into engagement with the socket member 32 in the same manner as described previously. Yet, the drive system can be moved readily from one anchor to the next, driving them in succession and without having to operate the locking collar for each connection and disconnection.

Attention now is directed to FIG. 4 which illustrates an offset coupler 90 which forms a part of the present invention. The offset coupler 90 may be employed in cases where the angle of misalignment is greater than one joint can accommodate. The offset coupler 90 comprises a tubular member 92 having one end which defines a receiving chamber 46B, a locking collar 62A, a biasing spring 64A, and a first locking assembly and a second locking assembly including the upper and lower balls 65A and 70A, the grooves 66A and 72A, and the weighted plug 68A, all identical to the those corresponding elements of the socket member 32 described above in reference to FIG. 2. The receiving chamber 46B can engage the ball member 50 of the anchor (FIG. 2) or the head 82 of the non-locking coupler 80 (FIG. 3).

The upper end of the offset coupler 90 comprises a ball member 50A having a hemispherical upper portion 56A, a curved neck 58A and planar side portions 55A, all as described above in reference to the earth anchor 52 of FIG. 2. Thus, the ball member 50A is similarly receivable in the receiving chamber 46 of the tubular portion 34 of the socket member 32. Now it will be appreciated that by using the offset coupler 90 between the socket member 32 and the ball member 50 on the earth anchor, two articulating joints are provided instead of one. Thus, the degree of misalignment which can be tolerated while driving or withdrawing the anchor is substantially increased.

Now it will be appreciated that the drive system of the present invention provides a main coupler which is easy to use. This system allows rotation even where there is some degree of misalignment between the anchor and the drive system, and the degree of tolerable misalignment is extended by using the offset coupler accessory. The locking assembly of this invention allows the ball member to be moved in multiple planes while locking the ball and socket members together.

What is claimed is:

1. A polygonal ball drive system comprising:
    a drive member adaptively connectable to a drive unit;
    a drive ball member having an upper portion, a non-circular central portion and a lower portion, wherein the lower portion of the drive ball member is adaptively connectable to a driven apparatus;
    a drive socket member comprising a first end and a second end, the first end connectable to the drive member, the second end comprising a tubular portion defining a drive ball receiving chamber for torque transmitting engagement with the central portion of the drive ball member;
    a drive socket locking assembly comprising a socket locking collar telescopically received over the drive socket member and axially slidingly movable between a receiving position and a locking position, and a first biasing member urging the socket locking collar to remain in the receiving position; and
    wherein the upper and lower portions of the drive ball member have diameters smaller than the central portion so as to permit angular axial misalignment of the drive ball member within the drive socket member.

2. The polygonal ball drive system of claim 1 wherein the receiving chamber of the tubular portion of the drive socket member is polygonal in cross section and wherein the central portion of the drive ball member is polygonal in cross section.

3. The polygonal ball drive system of claim 1 wherein the receiving chamber of the tubular portion of the drive socket member is hexagonal in cross section and wherein the central portion of the drive ball member is hexagonal in cross section.

4. The polygonal ball drive system of claim 1 wherein the upper portion of the drive ball member is hemispherical.

5. The polygonal ball drive system of claim 1 wherein the drive socket locking assembly further comprises a second biasing member adapted to urge the socket locking collar into the locking position.

6. The polygonal ball drive system of claim 5 wherein the second biasing member comprises a spring mounted around the drive socket member between the drive member and the socket locking collar.

7. The polygonal ball drive system of claim 1 wherein the drive socket locking assembly further comprises:
    a first retaining assembly responsive to the first biasing member for providing a retaining force on the socket locking collar in the receiving position; and
    a second retaining assembly retaining the drive ball member in the drive socket member when the socket locking collar is in the locking position.

8. The polygonal ball drive system of claim 7 wherein the tubular portion of the drive socket member further comprises an upper portion and a lower portion, wherein the upper tubular portion comprises at least one opening adjacent the upper portion of the drive ball member when the drive ball member is engaged with the drive socket member, and wherein the first retaining assembly of the drive socket locking assembly comprises:
    an internal circumferential groove in the socket locking collar, positioned to be adjacent to the opening in the upper tubular portion of the drive socket member when the socket locking collar is in the receiving position;
    at least one upper ball element sized to be movably receivable between the circumferential groove and the opening in the upper tubular portion of the drive socket member, wherein the upper ball element is received in the circumferential groove when the socket locking collar is in the receiving position and is received in the opening in the upper tubular portion of the drive socket member when the socket locking collar is in the locking position; and
    the first biasing member continuously urging the upper ball element radially outward toward the groove, locking the collar in the receiving position.

9. The polygonal ball drive system of claim 7 wherein the tubular portion of the drive socket member further comprises an upper portion and a lower portion, wherein the lower tubular portion comprises at least one opening adjacent to the lower neck portion of the drive ball member when the drive ball member is engaged with the drive socket member, wherein the second retaining assembly of the drive socket locking assembly further comprises:
    an internal circumferential groove in the socket locking collar, positioned to be adjacent to the opening in the lower tubular portion of the drive socket member when the socket locking collar is in the receiving position; and
    at least one lower ball element sized to be movably receivable between the circumferential groove and the opening in the lower tubular portion of the drive socket member;
    wherein the ball element is received in the circumferential groove when the socket locking collar is in the receiving position and received in the opening in the lower tubular portion of the drive socket member when the socket locking collar is in the locking position.

10. A polygonal ball drive system for use with a drive motor assembly to implant and withdraw an apparatus from the ground, the polygonal ball drive system comprising:
    a drive member operatively connectable to the drive motor assembly;
    a drive ball member having an upper portion, a non-circular central portion and a lower portion, wherein the lower portion of the drive ball member is drivingly connectable to the apparatus;
    a drive socket member having a first end and a second end, the first end being connectable to the drive member, the second end comprising a tubular portion defining a drive ball receiving chamber for torque transmitting engagement with the central portion of the drive ball member, the tubular portion having an upper portion and a lower portion, wherein the upper tubular portion comprises at least one opening adjacent the upper portion of the drive ball member when the drive ball member is engaged with the drive socket member; and a drive socket locking assembly to releasably lock the drive socket member and the drive ball member in operative engagement, the drive socket locking assembly comprising:
    a socket locking collar telescopically received over the drive socket member and axially movable between a receiving position and a locking position;
    a first retaining assembly retaining the socket locking collar in the receiving position, the first retaining assembly comprising:
        a first internal circumferential groove in the socket locking collar, positioned to be adjacent to the opening in the upper tubular portion of the drive socket member when the socket locking collar is in the receiving position;
        at least one upper ball element sized to be movably receivable between the first circumferential groove of the socket locking collar and the opening in the upper tubular portion of the drive socket member, wherein the upper ball element is received in the first circumferential groove when the socket locking collar is in the receiving position and is received in the opening in the upper tubular portion of the drive socket member when the socket locking collar is in the locking position; and
        a biasing assembly for continuously urging the upper ball element radially outward toward the first circumferential groove, locking the collar in the receiving position; and
    a second retaining assembly retaining the drive ball member in the drive socket member when the socket locking collar is in the locking position; and wherein the upper and lower portions of the drive ball member have diameters smaller than the central portion so as to permit angular axial misalignment of the drive ball member within the drive socket member.

11. The polygonal ball drive system of claim 10 wherein the receiving chamber of the tubular portion of the drive socket member is polygonal in cross section and wherein the central portion of the drive ball member is polygonal in cross section.

12. The polygonal ball drive system of claim 10 wherein the receiving chamber of the tubular portion of the drive socket member is hexagonal in cross section and wherein the central portion of the drive ball member is hexagonal in cross section.

13. The polygonal ball drive system of claim 10 wherein the upper portion of the drive ball member is hemispherical.

14. The polygonal ball drive system of claim 10 wherein the drive socket locking assembly further comprises a biasing member adapted to urge the socket locking collar into the locking position.

15. The polygonal ball drive system of claim 14 wherein the biasing member comprises a spring mounted around the drive socket member between the drive member and the socket locking collar.

16. The polygonal ball drive system of claim 10 wherein the lower tubular portion of the drive socket member comprises at least one opening adjacent to the lower neck portion of the drive ball member when the drive ball member is engaged with the drive socket member, wherein the second retaining assembly of the drive socket locking assembly further comprises:
    a second internal circumferential groove in the socket locking collar, positioned to be adjacent to the opening in the lower tubular portion of the drive socket member when the socket locking collar is in the receiving position; and
    at least one lower ball element sized to be movably receivable between the second circumferential groove and the opening in the lower tubular portion of the drive socket member;
    wherein the lower ball element is received in the second circumferential groove when the socket locking collar is in the receiving position and is received in the opening in the lower tubular portion of the drive socket member when the socket locking collar is in the locking position.

17. A polygonal ball drive system for transmitting power from a power source to a power output member, the polygonal ball drive system comprising:
    a drive ball member having an upper portion, a non-circular central portion and a lower portion, wherein the lower portion of the drive ball member is connectable to the power output member;
    a drive socket member having a first end and a second end, the first end being connectable to the power source, the second end comprising a tubular portion defining a drive ball receiving chamber for rotational meshing engagement with the central portion of the drive ball member, wherein the upper and lower portions of the drive ball member have diameters smaller than the central portion permitting angular misalignment of the drive ball member within the drive socket member;
    a drive socket locking assembly operatively movable between a receiving mode and a locking mode, comprising:
        a socket locking collar telescopically received over the drive socket member and slidingly movable to a first position in the receiving mode of the drive socket locking assembly and slidingly movable to a second position in the locking mode of the drive socket locking assembly;
        a first bias member to retain the socket locking collar in the first position permitting the drive ball member to be receivingly disposed within or removed from the receiving chamber; and
        a second bias member urging the socket locking collar to the second position when the socket locking collar is not retained by the first bias member, the second bias member thereby releasably coupling the drive ball member and the drive socket member preventing a withdrawal of the drive ball member from the drive socket member while permitting the axial misalignment of the drive ball member within the drive socket member.

* * * * *